(12) United States Patent
Wolf et al.

(10) Patent No.: US 6,526,069 B1
(45) Date of Patent: Feb. 25, 2003

(54) SYNCHRONIZATION DEVICE FOR A SYNCHRONOUS DIGITAL MESSAGE TRANSMISSION SYSTEM AND PROCESS FOR PRODUCING A SYNCHRONOUS OUTPUT SIGNAL

(75) Inventors: Michael Wolf, Mundelsheim (DE); Geoffrey Dive, Aspach (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/244,628

(22) Filed: Feb. 4, 1999

(30) Foreign Application Priority Data

Feb. 6, 1998 (DE) ......................... 198 04 795
Feb. 17, 1998 (DE) ......................... 198 06 449

(51) Int. Cl.[7] .............................. H04J 3/06; H04J 3/22
(52) U.S. Cl. ................... 370/503; 370/391; 370/395.1; 370/412; 370/420; 370/474; 370/491; 370/535; 370/906; 370/907; 370/916; 375/356; 375/371; 375/372
(58) Field of Search ................... 370/235, 389, 370/391, 395.1, 442, 420, 458, 465, 466, 474, 498, 503, 504, 505, 506, 516, 535, 905, 907, 916; 375/356, 371, 372

(56) References Cited

U.S. PATENT DOCUMENTS

| 4,025,720 | A | | 5/1977 | Pachynski et al. |
| 4,397,017 | A | * | 8/1983 | Rokugo ..................... 370/102 |
| 4,542,500 | A | * | 9/1985 | Jean-Claude ............... 370/102 |
| 5,119,406 | A | * | 6/1992 | Kramer ..................... 375/118 |
| 5,260,940 | A | * | 11/1993 | Urbansky ................... 370/84 |
| 5,263,056 | A | * | 11/1993 | Urbansky ................... 375/112 |
| 5,367,545 | A | | 11/1994 | Yamashita et al. |
| 5,563,877 | A | * | 10/1996 | Van Tetering et al. ...... 370/58.2 |
| 5,761,203 | A | * | 6/1998 | Morales .................... 370/418 |
| 5,815,504 | A | * | 9/1998 | Doi ......................... 370/503 |
| 6,236,660 | B1 | * | 5/2001 | Heuer ....................... 370/409 |
| 6,240,106 | B1 | * | 5/2001 | Slater ....................... 370/517 |

FOREIGN PATENT DOCUMENTS

| DE | 38 43 372 A1 | 7/1989 |
| DE | 38 42 371 A1 | 6/1990 |
| DE | 43 26 771 A1 | 2/1995 |
| DE | 195 39 474 A1 | 4/1997 |
| DE | 196 27 728 A1 | 1/1998 |
| WO | WO 94/27386 | 11/1994 |

OTHER PUBLICATIONS

P. Nowosad and G. Kuhn. Phase Deviations on SDH and SDH/PDH Interface. COMSIG '93. 1993 IEEE. pp. 52–57.*
LEMME, Helmut: "Telekommunikation wird weltweit einheitlich" Elecktronik Dec. 1993, pp. 94–99.
Klein, Michael J.; Urbansky, Ralph S.: "Sonet/SDH Pointer Processor Implementations" IEEE GLOBECOM Communications, 1994, pp. 655–660.
Michael J. Klein et al., "Sonet/SDH Pointer Processor Implentations", 1994 IEEE Globecom Communications: The Global Bridge, San Francisco, Nov. 28–Dec. 2, 1994, pp. 655–660.

(List continued on next page.)

Primary Examiner—Hassan Kizou
Assistant Examiner—Joe Logsdon
(74) Attorney, Agent, or Firm—Sughrue Mion, PLLC

(57) ABSTRACT

A synchronization device for a synchronous digital message transmission system producing a synchronous output signal including successive transport modules synchronized to a frame clock from a digital input signal. The synchronization device includes a receiver unit for receiving the input signal, a packet assembly device for packaging the input signal into subassemblies of the transport modules, a buffer memory, a writer for writing data bits of the input signal out of the subassemblies into the buffer memory with a write clock, a reader, for reading data bits out of the buffer memory with a read clock in order to form the output signal, and a sending unit (SO) for sending synchronous output signals. The effective bit rate of the subassemblies compared to the standardized value is either lowered or raised by selecting the write clock lower than the read clock.

8 Claims, 4 Drawing Sheets

OTHER PUBLICATIONS

ITU–T G.707 (3/96) Network Node Interface for the Synchronous Digital Heirarchy (SDH) International Telecommunication Union.

ITU–T G.813 (8/96) Timing characteristics of SDH equipment slave clocks (SEC), International Telecommunication Union.

* cited by examiner

SYNCHRONIZATION DEVICE FOR A SYNCHRONOUS DIGITAL MESSAGE TRANSMISSION SYSTEM AND PROCESS FOR PRODUCING A SYNCHRONOUS OUTPUT SIGNAL

BACKGROUND OF THE INVENTION

The invention relates to part of a synchronization device for a synchronous digital message transmission system for producing a synchronous output signal out of a digital input signal in accordance with the topic of claim 1 and a process for producing a synchronous output signal in accordance with the topic of claim 8.

A part of a synchronization device for SDH or SONET systems is known from the conference article "SONET/SDH Pointer Processor Implementation" by M. Klein and R. Urbansky, 1994 IEEE GLOBECOM Communications: The Global Bridge, San Francisco, Nov. 28–Dec. 2, 1994, pp. 655–660, such systems producing a synchronous output signal from plesiochronous or pseudosynchronous digital input signals. In addition, the input signals are written bit by bit with a write clock into buffer memory and read again with a read clock in order to form the synchronous output signal. Under this application, the read clock has to be synchronized to a reference clock pulse of the message transmission system, specifically with the precision set forth in ITU-T G.813 for SDH systems of ±4.6 ppm.

The output signals produced thus are transported over the message transmission system and reintegrated at the other end, using a desynchronization device, into their original plesiosynchronous or pseudosynchronous message signals. A difficulty that can emerge because of transmission is that low-frequency phase fluctuations can be added up that are caused by the intermediary saving in different buffer memories of the message transmission system. Such low-frequency phase fluctuations are characterized as wanders and can lead to exceeding buffer memory and any data loss tied to this. The conference article suggests avoiding such wanders by modulating the decision level of the pointer processor with a constant frequency. This wave modulation is however technologically expensive since all network elements have to be changed to deviate from the standardization. In addition, the wave modulation leads to a considerable increase of jitter in the message transmission system.

SUMMARY OF THE INVENTION

The task of the invention is to give a synchronization device for a synchronous digital message transmission system as well as a process for producing a synchronous output signal through which the low-frequency phase fluctuations are minimized in another, technologically less expensive fashion.

The task is solved with respect to the synchronization device through the characteristics of claim 1 and with respect to the process through the characteristics of claim 8. Advantageous reconfigurations can be interpolated from the dependent claims.

Beside the lessening and avoidance of wanders, another advantage of the invention is that both the synchronization device as well as the desynchronization device on the other end of the transmission leg and intermediately switched network elements of the synchronous digital message transmission system come out with smaller buffer memories than until now. Another advantage of the invention is that the duration of message signals through the message transmission system is diminished whenever the write clock is less than the read clock because the filling level of all buffer memory of the transmission leg then lies at the bottom limit. Another advantage of the invention is that the synchronization device in accordance with the invention is compatible with existing message transmission systems.

With another especially advantageous construction of the invention as under claim 7, an input signal is divided and packaged in a parallel fashion into several subassemblies of synchronous transport modules. These several subassemblies are saved intermediately with the write clock in the buffer memory and with the higher or lower read clock in such a way that several synchronous output signals are created. The particular advantage of this additional construction is that now input signals, for example ATM signals (asynchronous transport mode) or digitized video signals, can be processed that would explode the transportation capacity of a single virtual container. Through intermediary saving with the write clock in accordance with the invention—the write clock being lower than the read clock—phase fluctuations, i.e. differences in transmission time, of the different virtual containers can be avoided. Thus, a desynchronization device at the other end of the synchronous message transmission system achieves the simple integration of the transported portions packaged in several subassemblies that are from the original input signal put back into their original form.

BRIEF DESCRIPTION OF THE DRAWING

Below, three examples of how the invention can be implemented using FIGS. 1 through 6d are explained. They show:

FIG. 1 a synchronous digital message transmission system with synchronization and desynchronization device, FIG. 2 a block diagram of the synchronization device in accordance with the invention in the first example of implementation, FIG. 3 a block diagram of the synchronization device in accordance with the invention in the second example of implementation, FIG. 4 a block diagram of the synchronization device in accordance with the invention in the third example of implementation, FIG. 5 a flowchart of the process in accordance with the invention, and FIGS. 6a through 6d: applications of the invention.

DETAILED DESCRIPTION OF THE INVENTION

Figure 1:
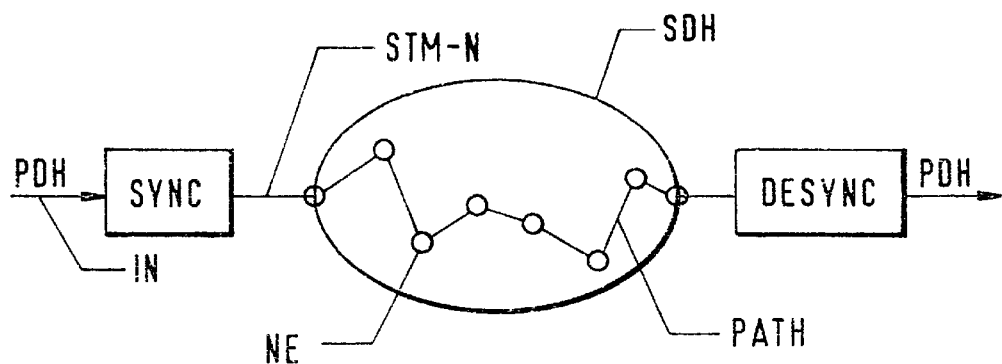

In FIG. 1, the synchronous digital message transmission system SDH of the example of implementation is shown schematically. It regards a number of network elements linked together among themselves such as cross-connect device and add/drop multiplexers. A synchronization device SYNC constitutes the interface between the synchronous digital message transmission system and a plesiochronic message transmission system. The synchronization device receives as an input signal a plesiochronic message signal PDH and produces out of it a synchronous message signal STM-N that sends them into the synchronous digital message transmission system SDH. Over a pathway PATH of the message transmission system that runs over a number of intermediarily switched network elements NE shown as an example, the synchronous message signal STM-N is transmitted to the desynchronization device. There, it is again reintegrated to the original plesiochronic message signal PDH.

A synchronous message signal STM-N consists of successive synchronous transport modules that are synchronized to a frame clock. The synchronous message signal STM-N is synchronized to a reference clock pulse uniform in the entire synchronous message transmission system. So that a plesiochronic message signal can be transmitted over a synchronous digital message transmission system, it has to be packaged into the usage burden of the synchronous transport modules. The synchronization device performs this.

A basic idea of the invention is in packaging input signals first in subassemblies of the synchronous transport modules, so-called virtual containers VC-N in the sie N (N=11, 12, 2, 3, or 4), lowering or raising the effective bit rate of the virtual contains in comparison with the standardized value (see ITU-T G.707, 03/96, Chapter 6.1), or multiplexing. Thus, the filling level of buffer memories of intermediarily switched network elements can be stored in the area of the lower and/or upper limit and kept constant, thus diminishing an adding of wanders.

Figure 2:
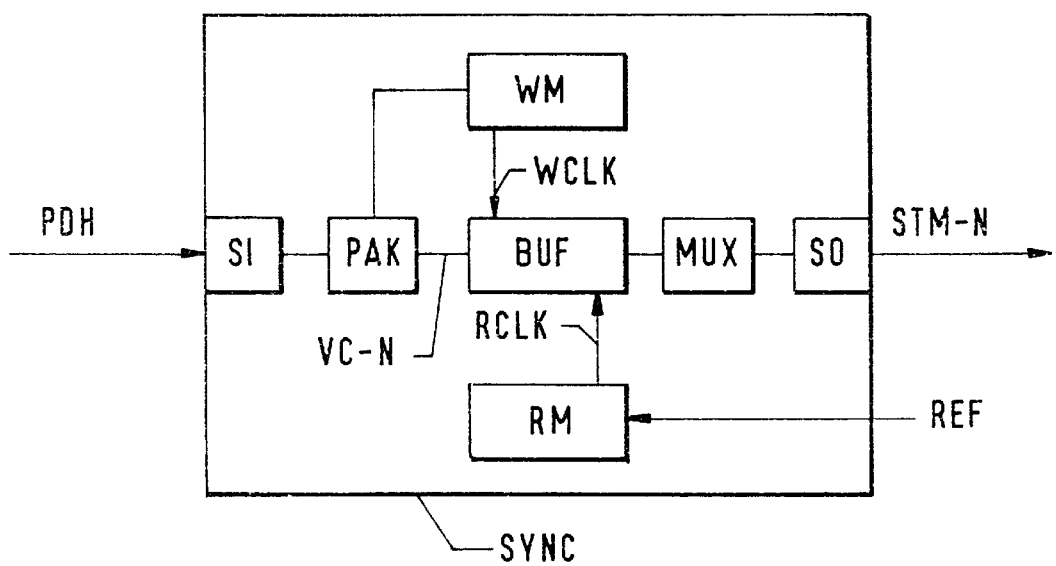

In FIG. 2, the block diagram of a synchronization device SYNC in accordance with the invention is shown in a first example of implementation. It contains a receiver unit SI, e.g. a interface switching with optoelectric wanders (e.g. following ITU-T G.703) that receives a digital input signal PDH. For the input signal, it is a question of a plesiochronic message signal. From the receiver unit, the received message signal is conducted further to the package assembly device PAK that packages it in subassemblies of the synchronous transport modules, so-called virtual containers VC-N. The data bits of the input signal packaged this way are then written using a writer WM with a write clock WCLK into the buffer memory BUF. The writer WM includes a clock pulse generator for the write clock WCLK. Using a reader RM, the data bits are then read back out with a read clock RCLK and routed to a multiplex device MUX, which multiplexes the subassemblies that now are synchronized to the read clock into the transport modules. Multiplexing occurs as described in ITU-T G.707, 03/96, Chapter 6.1.

In accordance with the invention, the write clock WCLK is lower than the read clock RCLK. The read clock RCLK is synchronized to the reference clock pulse of the message transmission system. Through this, the effective bit rate of the virtual container in comparison to the value set forth in the standard is lowered. The difference between the effective bit rate of the virtual container VC-N and the standardized bit rate is balanced out through stuffing procedures that are characterized as pointer actions (pointer justification).

The write clock WCLK can be chosen advantageously by 4.6 ppm lower than the read clock RCLK. A deviation of the bit clock pulse of sent output signals from the reference clock pulse of the message transmission system of 4.6 ppm is the maximum permitted deviation under ITU-T G.813. Particularly advantageous is the write clock, however, chosen by more than 4.6 ppm lower than the reference clock pulse in order to effect that the buffer memory of all intermediarily switched network elements in the transmission pathway through the message transmission system always remain on the lower filling limit at any permissible synchronization state. Thereby, the emergence of wanders is inhibited. Of course, through the stuffing process jittering can arise, but this can however be removed in the desynchronization device on the other end of the transmission pathway to a sufficient degree through deep pass filtering.

The write clock is even less selected than the read clock such that the maximum permitted rate in the synchronous digital message transmission system is achieved at stuffing processes. As long as this maximum permitted rate is not exceeded, the output signal can b transported over existing SDH networks or SONET networks. However, the less the write clock, the higher the frequency of jitter arising from balancing pointer actions and the better this jitter can be removed through deep-pass filtering. For this reason, the write clock can be selected up to 200 ppm lower than the read clock and/or the reference clock pulse of the message transmission system.

Beyond plesiochronic message signals, other digital input signals can also be transmitted over the digital synchronous message transmission system, such as coded video signals, for example.

Figure 3:
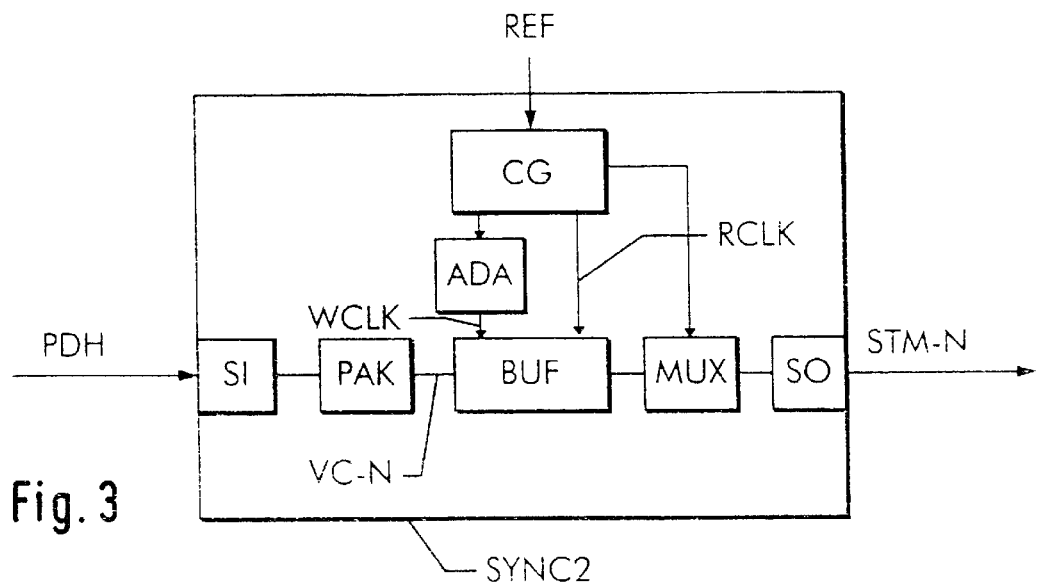

A second example of implementation of the invention is shown in FIG. 3 in a block diagram. The synchronization device SYNC2 has, as in the first example of implementation, a means of input SI, a means of output SO, buffer memory BUF, a package assembly device PAK and a multiplexing device MUX. Unlike the first example of implementation, the synchronization device possesses a clock pulse generation CG that is synchronized to the reference clock pulse REF of the message transmission system. This clock pulse generator takes care of all machine-internal construction groups, such as the multiplexing device with a clock pulse signal. This clock pulse signal also serves as read clock RCLK. Between clock pulse generator CG and the write clock input of the buffer memory BUF, a clock pulse adaptation circuit ADA is turned on that lowers the clock pulse of the clock pulse generator CG in order to generate the write clock WCLK. Thereby it is achieved that the write clock is lower than the read clock.

In an advantageous further construction of the invention, this clock pulse adaptation circuit is adjustable and controllable such that the write and read cycle agree at least in the limits standardized for the clock pulse deviation in SDH. Through this it can be achieved that the function can be turned off in order to use a lower write clock so that the synchronization device in accordance with the invention can work together with the usual desynchronization devices. Turning on and off is controlled advantageously through a message in the frame head (overhead) of sent transport modules. Using this message, the desynchronization device is shared on the other end of the transmission pathway that the bit rate of the virtual container VC-N is lowered to the invention-related way. In addition, a bit or byte reserved for company-specific applications is used advantageously in the frame-tip of synchronous transport modules. In an advantageous fashion, the desynchronization device leaves a receipt for the message and thus allocates to the synchronization device its ability to process the expected high rate of pointer actions. The desynchronization device can additionally have narrow-band clock pulse filtering with a bandwidth in the area of 10 to 100 mHz.

Figure 4:
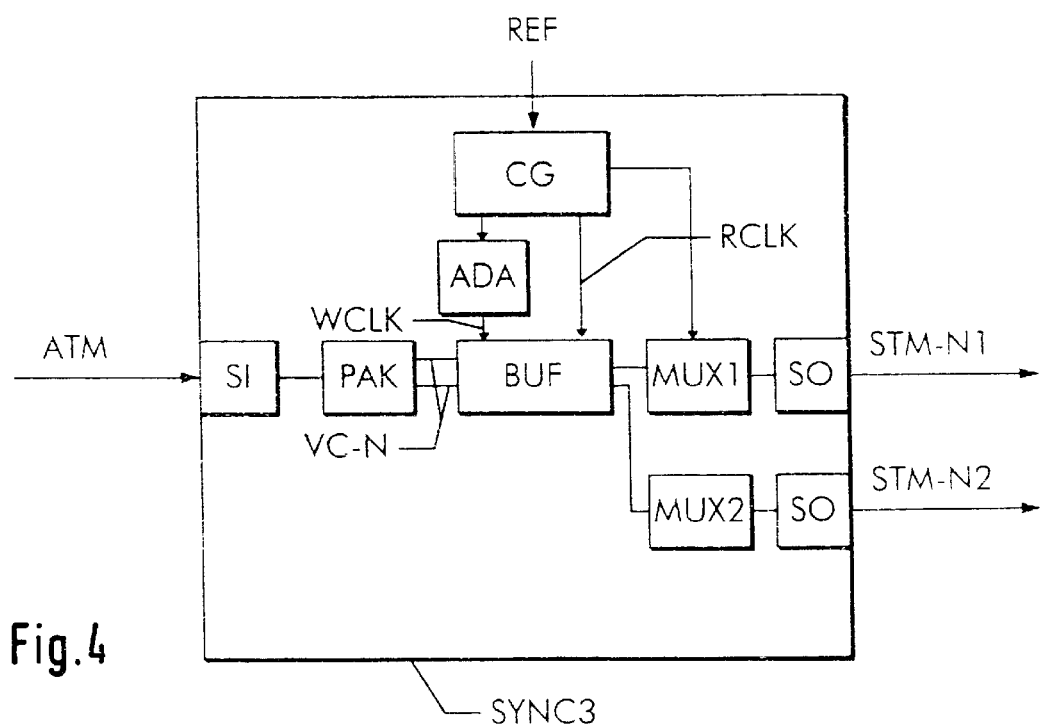

In accordance with the third example of implementation shown in FIG. 4 of a synchronization device SYNC3, two virtual containers VC-N are formed from the packet assembly device PAK out of the input signal ATM. This also means that two virtual containers are used independently from each other which indicate the different virtual connections through the synchronous digital message transmission system. The several virtual containers VC-N have a lower bit rate in accordance with the invention than prescribed by G. ITU-T G.707, 03/96, Chapter 6.1, and are written with the write clock WCLK lowered by the clock pulse adaptation circuit ADA into the buffer memory BUF. They are then read back out of the buffer memory BUF with the read clock RCLK that is produced by the clock pulse generator CG of the synchronization device SYNC3 and is synchronized to the reference clock pulse REF of the message transmission system. The reading occurs in such a way that of two multiplexer devices MUX1 and MUX2 there are several synchronous output signals built STM-N1, STM-N2. The two synchronous output signals STM-N1, STM-N2 are then transmitted by two sending units SO over the synchronous message transmission system. On the other end of the message transmission system, the usage burden of both output signals STM-N1 and STM-N2 can then be unpackaged again and reintegrated into the original input signal ATM.

The measures depicted in the third example of implementation for dividing an input signal and for transmitting it packaged in several virtual containers, is characterized as virtual concatenation described in ITU-T G.707, 3/96, Chapters 8.1.7.2 and 8.3.6.2. This measure can be applied, for example, when the bit rate of the input signal is higher than the maximum usage burden of the virtual containers. Thus, input signals can also be transmitted with a transmission rate of more than 140 Mbit/s (the capacity of a VC-4 is 139,264 kbit/s) in the synchronous digital message transmission system. Through the use in accordance with the invention of virtual containers with a bit rate reduced in comparison to the standard, it is advantageously achieved that the phase deviation arising because of wanders between the several virtual containers are minimal, which makes the integration in the desynchronization possible on the other end of a transmission pathway.

Figure 5:
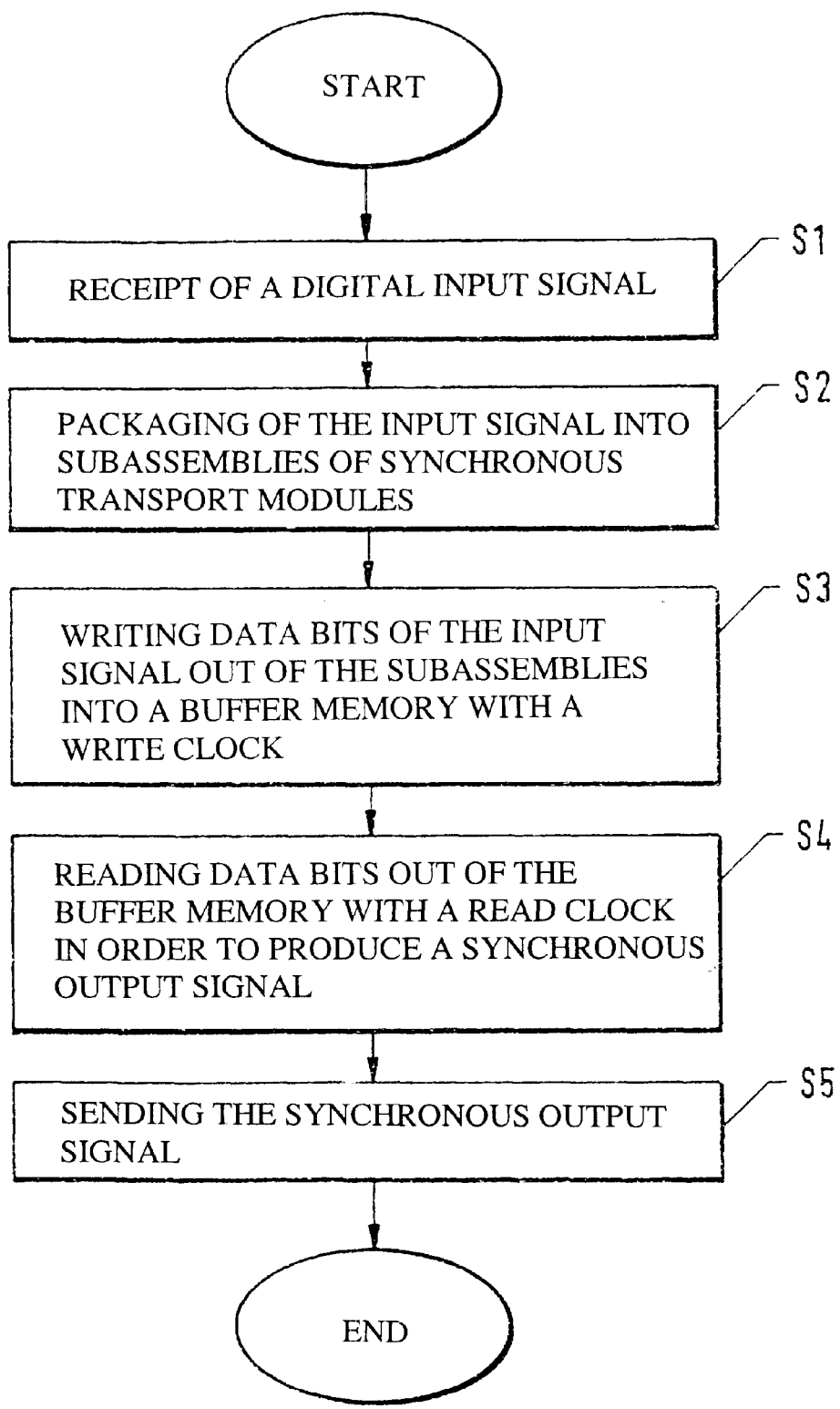

In FIG. 5, a flow chart is shown with the process in accordance with the invention of producing a synchronous output signal. Successive steps must be executed:

Step S1: A digital input signal is received at a synchronization device over a receiver unit that is a PDH interface in the examples of implementation.

Step S2: The digital input signal is packaged using a package assembly device in subassemblies of synchronous transport modules, so-called virtual containers.

Step S3: The data bits of the virtual container are written after each other with the write clock of a writer into buffer memory.

Step S4: The data bits are read back out with the read clock of a reader from the buffer memory in order to form the synchronous output signal. Here, the read clock is higher than the write clock, preferentially by at least 4.6 ppm.

Step S5: The output signal is sent over a sending unit into the synchronous digital message transmission system.

Between steps S4 and S5, a multiplexing of several virtual containers can take place into the synchronous transport modules. Then, several input signals are packaged with a bit rate lower than the standardized one into virtual containers.

Figure 6A:
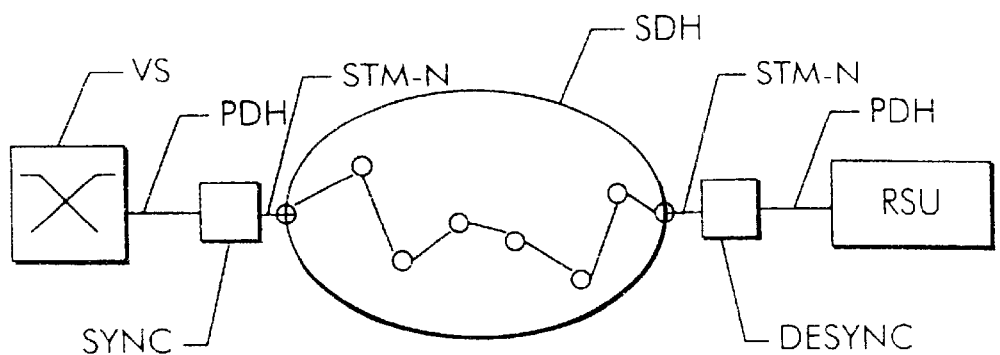
Figure 6B:
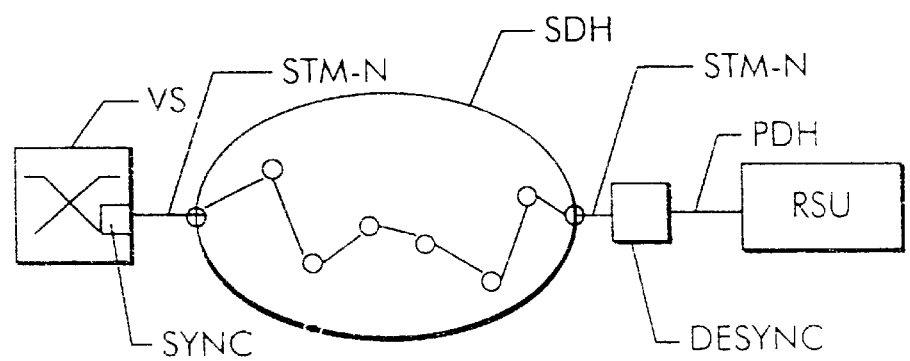

Applications of the invention are shown in FIGS. 6a through 6d. In FIG. 6a, it can be seen that the digital input signal PDH, a plesiochronic message signal, is produced by a exchange point VS, over a invention-specific synchronization device SYNC, a synchronous digital message transmission system SDH and a desynchronization device DESYNC is sent to a concentrator RSU. Here, the exchange point VS synchronizes the concentrator RSU with the help of the plesiochronic message signal PDH transmitted this way. This is possible because, thanks to the invention, low-frequency phase fluctuations do not occur in the message signal. In FIG. 6b it is shown that the invention-specific synchronization device SYNC can also be integrated into the exchange point.

Figure 6C:
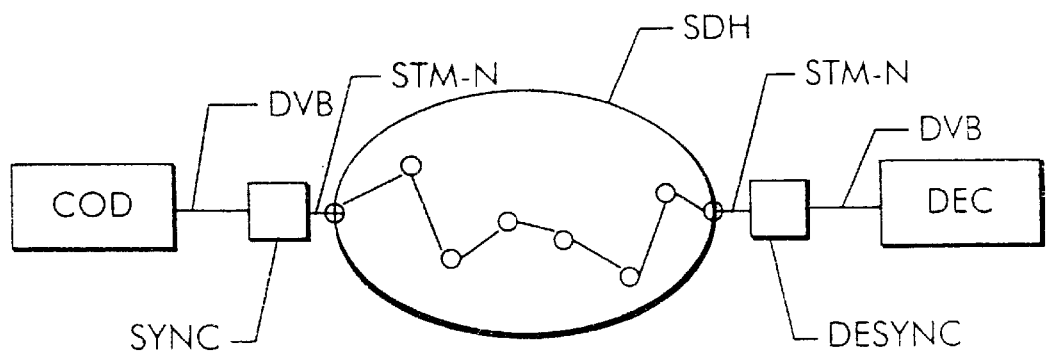
Figure 6D:
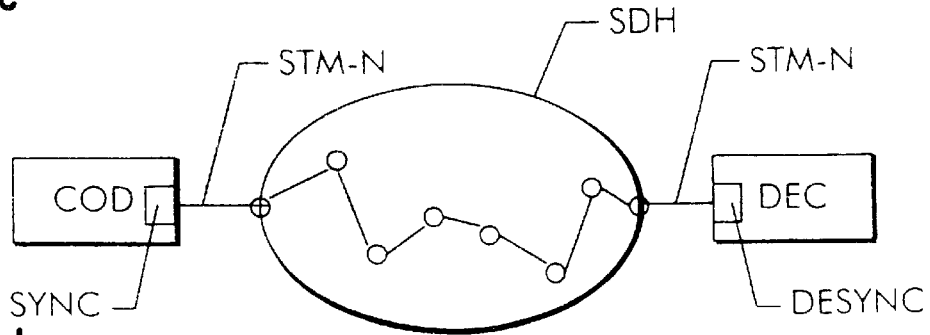

In FIG. 6c, a coding device COD for video signals produces the digital input signal DVB, a digital video signal. It can for example be a question of VoD or DVB signals (VoD: video on demand; DVB: digital video broadcasting) or also a question of signals with a bit rate of 34 or 140 Mbit/s. The input signal DVB is sent as in FIG. 6a over synchronization device, synchronous digital message transmission system and desynchronization device to a decoding device DEC for digital video signals. This is advantageous because, with this construction, thanks to the invention, also possible is synchronizing the decoding device DEC with the transmitted digital video signal DVB to the coding device COD. In FIG. 6d it is shown that the invention-specific synchronization device SYNC can also be integrated into the coding device COD and that the dysynchronization device DEC can also be integrated into the decoding device DEC.

The write clock is always selected lower in the examples of implementation than the read clock. This form of implementation is preferred because this way it can be achieved that the signal durations are minimal through the synchronous digital news transmission system since all buffer memory of network elements are in the transmission pathway on the lower filling level. The invention is however also deployable with a positive frequency offset, i.e. with a write clock higher in comparison to the read clock because wanders is avoided in an execution because the filling level of the buffer memory is then at the upper limit.

What is claimed is:

1. A synchronization device (SYNC) for a synchronous digital message transmission system (SDH) for receiving a digital plesiochronous input signal (PDH) and for producing a synchronous output signal (STM-N), comprising successive transport modules synchronized to a frame clock, whereby the synchronization device (SYNC) includes:
   a reception unit (SI) for receiving the digital plesiochronous input signal (PDH),
   a buffer memory (BUF),
   a writer (WM) for writing data bits of the digital plesiochronous input signal (PDH) into the buffer memory (BUF) with a write clock (WCLK),
   a reader (RM) for reading data bits out of the buffer memory with a read clock (RCLK),
   an output unit (SO) to output the synchronous output signal (STM-N) from the synchronization device (SYNC), and
   a packet assembly device (PAK) arranged between the receiver unit (SI) and the buffer memory (BUF) for packaging the digital plesiochronous input signal into subassemblies (VC-N) of the transport module,
   wherein the writer (WM) is constructed so that it writes the data bits of the digital plesiochronous input signal (PDH) out of the subassemblies (VC-N) into the buffer memory (BUF), and
   wherein the write clock (WCLK) of the writer (WM) is lower or higher than the read clock (RCLK) of the reader (RM).

2. A synchronization device (SYNC) according to claim 1 whereby the read clock (RCLK) and the write clock (WCLK) are generated by a clock pulse generator (CG) and the write clock (WCLK) is lowered using a clock pulse adaptation circuit (ADA) arranged downstream of the clock pulse generator (CG).

3. A synchronization device (SYNC) according to claim 2 whereby the clock pulse adaptation circuit (ADA) is controllable such that the read clock (RCLK) and the write clock (WLCK) agree with the boundaries permitted for the synchronous digital message transmission network (SDH).

4. A synchronization device (SYNC) according to claim 3 whereby a signal device is provided for, which produces a message within the frame head of the synchronous transport modules to be sent when the clock pulse adaptation circuit (ADA) is controllable such that the write clock (RCLK) is lower than the read clock (WCLK).

5. A synchronization device (SYNC) according to claim 1 whereby the write clock (WCLK) is so much lower than the read clock (RCLK) that the maximum rate of pointer actions permitted in the synchronous digital message transmission network (SDH) is achieved.

6. A synchronization device (SYNC) according to claim 1 whereby the write clock (WCLK) of the writer (WM) is lower than the read clock (RCLK) of the reader (RM) by at least 4.6 ppm.

7. A synchronization device (SYNC3) according to claim 1 whereby the packet assembly device (PAK) divides an input signal (ATM) and packages it in a parallel fashion into several subassemblies (VC-N) of synchronous transport modules whereby a writer (CD, ADA) writes the several subassemblies (VC-N) with the write clock (WCLK) into the buffer memory (BUF), and readers (CG) are set up such that they read the several subassemblies (VC-N) with the read clock (RCLK) out of the buffer memory (BUF) in such a way that several synchronous output signals (STM-N1, STM-N2) are created.

8. A process for producing a synchronous output signal (STM-N) that comprises successive transport modules synchronized to a frame clock, with the following steps:

receiving a digital plesiochronous input signal (PDH);

packaging the digital plesiochronous input signal (PDH) into subassemblies (VC-N) of the transport modules;

writing data bits of the digital plesiochronous input signal out of the subassemblies (VC-N) into a buffer memory (BUF) with a write clock (WCLK);

reading data bits out of said buffer memory (BUF) with a read clock (RCLK) in order to build the synchronous output signal (STM-N);

outputting the synchronous output signal (STM-N); and wherein the write clock (WCLK) is lower than the read clock (RCLK).

* * * * *